(12) United States Patent
Ha et al.

(10) Patent No.: US 11,711,041 B2
(45) Date of Patent: Jul. 25, 2023

(54) MOTOR DRIVE SYSTEM COMPRISING POWER NETWORK BETWEEN INVERTER AND MOTOR

(71) Applicant: SEOUL NATIONAL UNIVERSITY R&DB FOUNDATION, Seoul (KR)

(72) Inventors: Jung-Ik Ha, Seoul (KR); Yong Su Han, Bucheon-si (KR); Ka Hyun Lee, Seoul (KR); Hyeon Gyu Choi, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 114 days.

(21) Appl. No.: 17/057,588

(22) PCT Filed: Feb. 11, 2019

(86) PCT No.: PCT/KR2019/001629
§ 371 (c)(1),
(2) Date: Nov. 20, 2020

(87) PCT Pub. No.: WO2019/225835
PCT Pub. Date: Nov. 28, 2019

(65) Prior Publication Data
US 2021/0194403 A1 Jun. 24, 2021

(30) Foreign Application Priority Data
May 23, 2018 (KR) .......................... 10-2018-0058359

(51) Int. Cl.
*H02P 27/06* (2006.01)
*H02K 11/00* (2016.01)

(52) U.S. Cl.
CPC .......... *H02P 27/06* (2013.01); *H02K 11/0094* (2013.01)

(58) Field of Classification Search
CPC ........................... H02P 27/06; H02K 11/0094
(Continued)

(56) References Cited

U.S. PATENT DOCUMENTS 6,166,928 A * 12/2000 Chandorkar ........ H02P 23/0004
363/41
9,106,125 B1 * 8/2015 Brandt ..................... H03H 7/09
(Continued)

FOREIGN PATENT DOCUMENTS

| EP | 0221247 B1 | 9/1990 |
| EP | 2575250 A1 | 4/2013 |

(Continued)

OTHER PUBLICATIONS

Beldi, M.A. et al., "Design of Microstrip Power Dividers with Filtering Functions," Proceedings of the 42nd European Microwave Conference, Nov. 2012, pp. 384-387.
(Continued)

*Primary Examiner* — Kawing Chan
(74) *Attorney, Agent, or Firm* — Fenwick & West LLP

(57) ABSTRACT

Embodiments relate to a motor driving system comprising a power network between an inverter and a motor and a method for designing such motor drive system, the motor drive system comprising: an AC motor; an inverter unit for applying a voltage to the AC motor; a controller configured for controlling an output voltage of the inverter unit; and a power network circuit disposed between the inverter unit and the AC motor, wherein the power network circuit is configured with passive element.

6 Claims, 21 Drawing Sheets

(58) Field of Classification Search
USPC .......................................................... 318/801
See application file for complete search history.

(56) References Cited

U.S. PATENT DOCUMENTS

| | | | |
|---|---|---|---|
| 2005/0057210 A1 | 3/2005 | Ueda et al. | |
| 2009/0066272 A1* | 3/2009 | Jobard | B60L 7/003 |
| | | | 318/375 |
| 2019/0273429 A1* | 9/2019 | Li | H02P 29/50 |

FOREIGN PATENT DOCUMENTS

| | | |
|---|---|---|
| KR | 10-0654487 B1 | 12/2006 |
| KR | 10-1139476 B1 | 5/2012 |
| WO | WO 2012/026535 A1 | 3/2012 |

OTHER PUBLICATIONS

Khoshsaadat, A. et al., "Fifth-Order T-Type Passive Resonant Tanks Tailored for Constant Current Resonant Converters," IEEE Transactions on Circuits and Systems—I: Regular Papers, vol. 65, Issue 2, Feb. 2018, pp. 842-853.

Peng, F., "Z-Source Inverter," IEEE Transactions on Industry Applications, vol. 39, No. 2, Mar./Apr. 2003, pp. 504-510.

Sakai, K. et al., "Principles and Characteristics of an Ultralightweight Electromagnetic Resonance Coupling Machine With a Cage Rotor," IEEE Energy Conversion Congress and Exposition, Oct. 2017, pp. 1154-1160.

Sakai, K. et al., "Ultralightweight Motor Design Using Electromagnetic Resonance Coupling," IEEE Energy Conversion Congress and Exposition, Sep. 2016, pp. 1-7.

* cited by examiner

MOTOR DRIVE SYSTEM COMPRISING POWER NETWORK BETWEEN INVERTER AND MOTOR

TECHNICAL FIELD

This disclosure relates to a motor driving system, and more particularly, a motor driving system having a power network circuit configured with a passive element between an inverter and a motor.

BACKGROUND ART

FIG. 1 shows an equivalent per-phase circuit with a three-phase structure of a general motor. In the per-phase circuit substituted as shown in FIG. 1, an output voltage v1 and a counter electromotive force voltage v2 of an inverter are shown as input and output voltages, and the phase impedance is shown as a series combination of an inductor and a resistor. Here, v2 is the counter electromotive force voltage, and its size is generally proportional to speed. In the case of a voltage-type inverter, the output voltage v1 of the inverter is limited (Vdc/√3 in the case of PWM, 2Vdc/π in the case of Six-step), so the maximum operating area is limited when considering the inductor, the resistance voltage drop and the counter electromotive force.

FIG. 2 shows a torque-speed curve of a conventional motor. Referring to FIG. 2, a maximum speed at which a constant torque is maintained as marked in green is referred to as a base speed, and this speed is determined by the limit of the voltage size mentioned above. In other words, if the DC-link voltage increases and thus the maximum value of v1 increases, the base speed increases.

FIGS. 3A and 3B show conventional methods for raising an output voltage to increase the bases peed. FIG. 3A is a boost converter method, and FIG. 3B is a z-source inverter method.

Referring to FIG. 3A, in a voltage-type inverter, the output voltage is limited according to the size of a DC-link voltage, so a boost converter is used to increase the DC-link voltage. By using the boost converter connected in series to the inverter, the DC-link voltage may be increased to a range in which the boost converter within a device rating is controllable. Therefore, there is an advantage that the maximum output voltage of the inverter can be improved, but there is a disadvantage that the volume and switching loss increase due to additional inductor and switch. In addition, if the DC-link voltage increases, the voltage stress of a switching element increases, and an insulation interval or the like of the driving circuit should be considered again. Therefore, it is necessary to redesign the driving circuit by element selection and artwork.

Referring to FIG. 3B, a Z-source inverter is used to boost the DC-link voltage with only a passive element without using a boost converter. In this method, by adding a shoot-through time of an inverter leg (the time to turn on both upper and lower switches), the energy transfer process performed by the boost converter is performed by the inverter itself. However, since the inverter output is limited by the shoot-through time, there is a problem that the inverter cannot use the voltage to its maximum. In addition, there is a problem that the driving circuit needs to be redesigned because the voltage stress increases like the boost converter.

RELATED LITERATURES

Non-Patent Literature

Non-patent Literature 1: P. Fang Zheng, "Z-source inverter," IEEE Transactions on Industry Applications, vol. 39, no. 2, pp. 504-510, 2003

DISCLOSURE

Technical Problem

In order to solve the above problem according to an embodiment of the present disclosure, there is a need for a way to increase a motor speed without requiring an additional switch and increasing a DC-link voltage itself.

Technical Solution

A motor driving system having a power network between an inverter and a motor comprises an AC motor, an inverter unit configured to apply a voltage to the AC motor, a controller configured to control an output voltage of the inverter unit, and a power network circuit disposed between the inverter unit and the AC motor, wherein the power network circuit may be configured with passive element.

In an embodiment, the power network circuit may be configured as a T-type impedance model.

In an embodiment, the power network circuit may be configured with at least one of:

a capacitor connected in series to the AC motor; a capacitor connected in series to the AC motor and an inductor connected in parallel thereto; an inductor connected in parallel to the AC motor and a capacitor connected in series thereto; a capacitor and an inductor in series to the AC motor and an inductor connected in parallel thereto; a capacitor and an inductor in series to the AC motor and a capacitor connected in parallel thereto; an inductor connected in series to the AC motor and an inductor and a capacitor connected in parallel thereto; and a capacitor connected in series to the AC motor and an inductor and a capacitor connected in parallel thereto.

In an embodiment, the power network circuit may further include a mechanical or electric switch, and the mechanical or electric switch may be turned off in a first mode in which the AC motor is operating at a speed less than a predetermined speed and be turned on in a second mode in which the AC motor is operating at a speed equal to or greater than the predetermined speed.

In an embodiment, when the power network circuit is configured with a capacitor connected in series to the AC motor, a value of the capacitor may be determined based on an inductance of the AC motor, a magnetic flux density of a permanent magnet of the AC motor and a maximum voltage of the inverter unit.

In an embodiment, the power network circuit may be configured with at least one of a capacitor and an inductor, the T-type impedance model may include a first impedance and a second impedance connected in series to the AC motor; and a third impedance extending from a node between the first impedance and the second impedance and connected in parallel to the first impedance and the second impedance, and the first impedance, the second impedance and the third impedance may be expressed as follows.

first impedance: $jX_{11} - jX_{12}$
second impedance: $jX_{22} - jX_{12}$
third impedance: $jX_{12}$ In an embodiment, values of the capacitor and the inductor configuring the power network circuit may be determined such that a following formula satisfies 0.

$$X_{11} - \frac{X_{12}^2 X_{22}}{r_m^2 + X_{22}^2}$$

Here, $r_m$ is an equivalent resistance of the AC motor.

In an embodiment, the AC motor may be at least one selected from a surface-mounted permanent magnet motor, an induction motor and an interior permanent magnet synchronous motor.

In an embodiment, when a power ratio of the power network circuit is greater than a power ratio of the inverter unit, a value of the impedance configuring the power network circuit may be selected to minimize the sum of a size of the power network circuit and a size of the inverter unit. Here, the size of the power network circuit may be the sum of maximum values of reactive powers of all passive elements included in the power network circuit. In another aspect of the present disclosure, there is provided a method of designing a motor driving system having a power network between an inverter and a motor, the motor driving system including: an AC motor; an inverter unit configured to apply a voltage to the AC motor; a controller configured to control an output voltage of the inverter unit; and a power network circuit disposed between the inverter unit and the AC motor, wherein the power network circuit is configured with a passive element and configured as a T-type impedance model.

In an embodiment, when the power network circuit is configured with a capacitor connected in series to the AC motor, a value of the capacitor may be determined based on an inductance of the AC motor, a magnetic flux density of a permanent magnet of the AC motor and a maximum voltage of the inverter unit.

In an embodiment, the T-type impedance model may include a first impedance and a second impedance connected in series to the AC motor; and a third impedance extending from a node between the first impedance and the second impedance and connected in parallel to the first impedance and the second impedance, and the first impedance, the second impedance and the third impedance may be expressed as follows.

first impedance: jX11-jX12
second impedance: jX22-jX12
third impedance: jX12

In an embodiment, a value of the impedance configuring the power network circuit may be determined such that a following formula satisfies 0.

$$X_{11} - \frac{X_{12}^2 X_{22}}{r_m^2 + X_{22}^2}$$

Here, $r_m$ may be an equivalent resistance of the AC motor.

In an embodiment, a value of the impedance configuring the power network circuit may be selected to minimize the sum of a size of the power network circuit and a size of the inverter unit. Here, the size of the power network circuit may be the sum of maximum values of reactive powers of all passive elements included in the power network circuit.

Advantageous Effects

In the motor driving system having a power network between an inverter and a motor according to an embodiment of the present disclosure, since a power network circuit configured with a passive element is inserted between the inverter and the motor, the maximum output of the corresponding motor is improved under the same voltage and current limit conditions. The power network circuit may be applied to an induction motor (IM), a surface-mounted permanent magnet synchronous motor (SPM) and an interior permanent magnet synchronous motor (IPM), and improved output has been confirmed. The passive element included in the power network circuit may be configured in various ways, but in this specification, for the sake of simplicity of explanation, the effect will be explained about the case where capacitors are connected in series, the case where two elements of LC or CL are used, and the case where three elements such as LCC are used.

Figure 1:
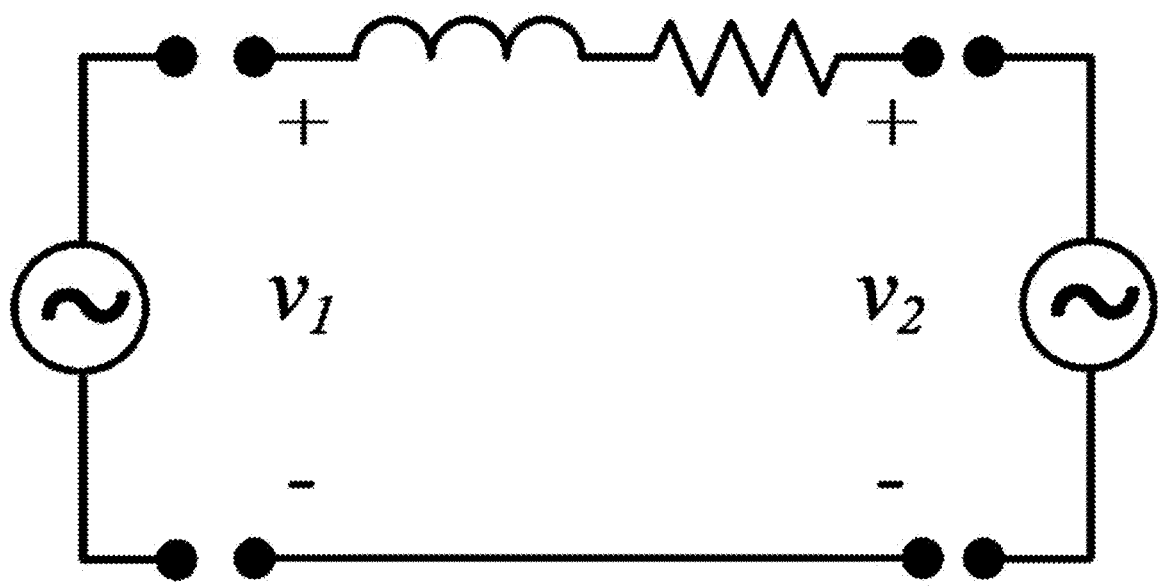
FIG. 1 shows an equivalent per-phase circuit with a three-phase structure of a general motor.
Figure 2:
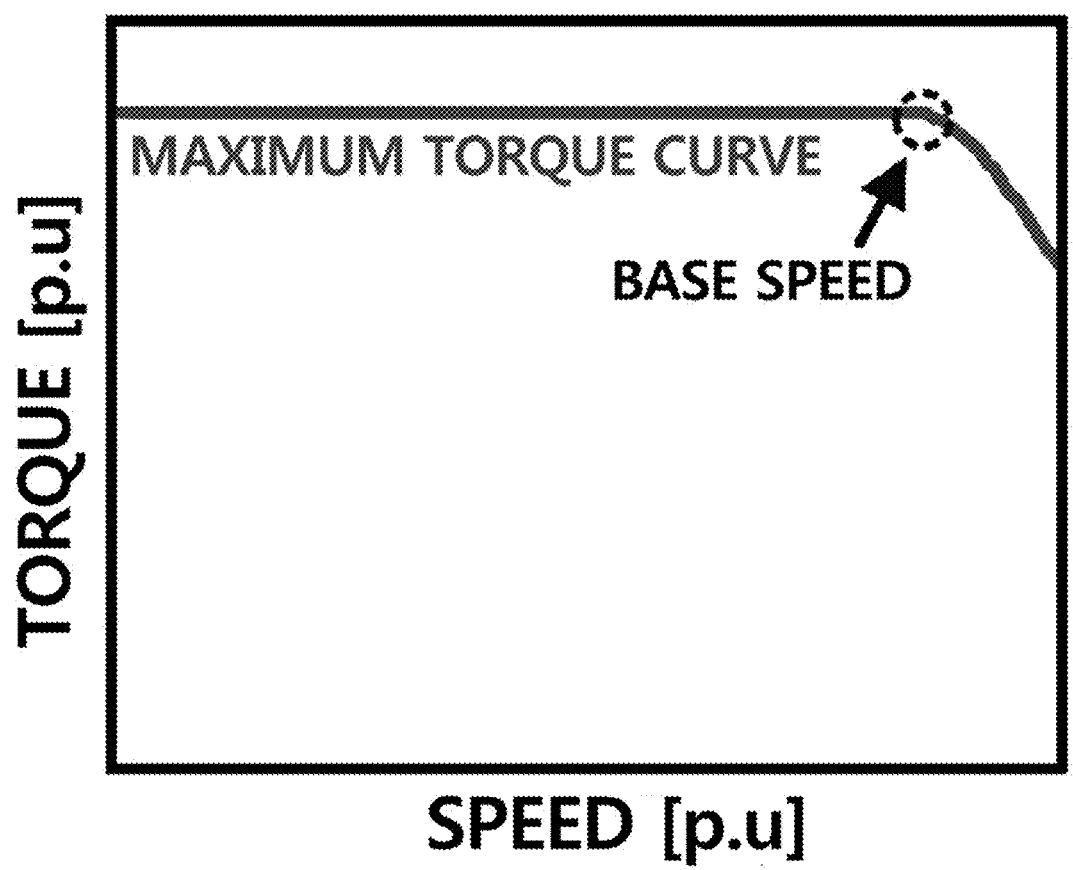
FIG. 2 shows a torque-speed curve of a conventional motor.
Figure 3A:
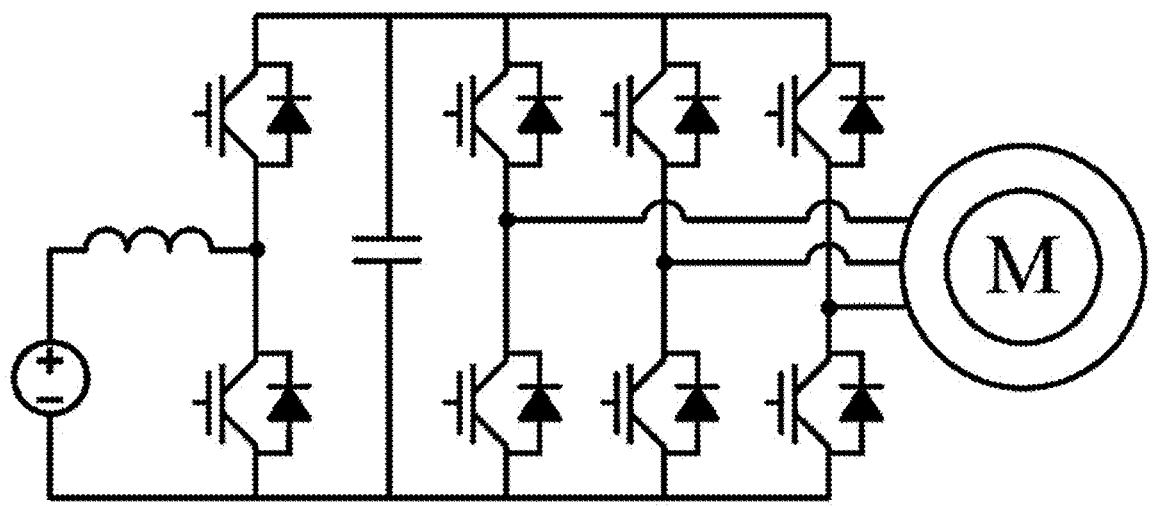
FIGS. 3A and 3B show conventional methods for raising an output voltage to increase a driving speed.
Figure 3B:
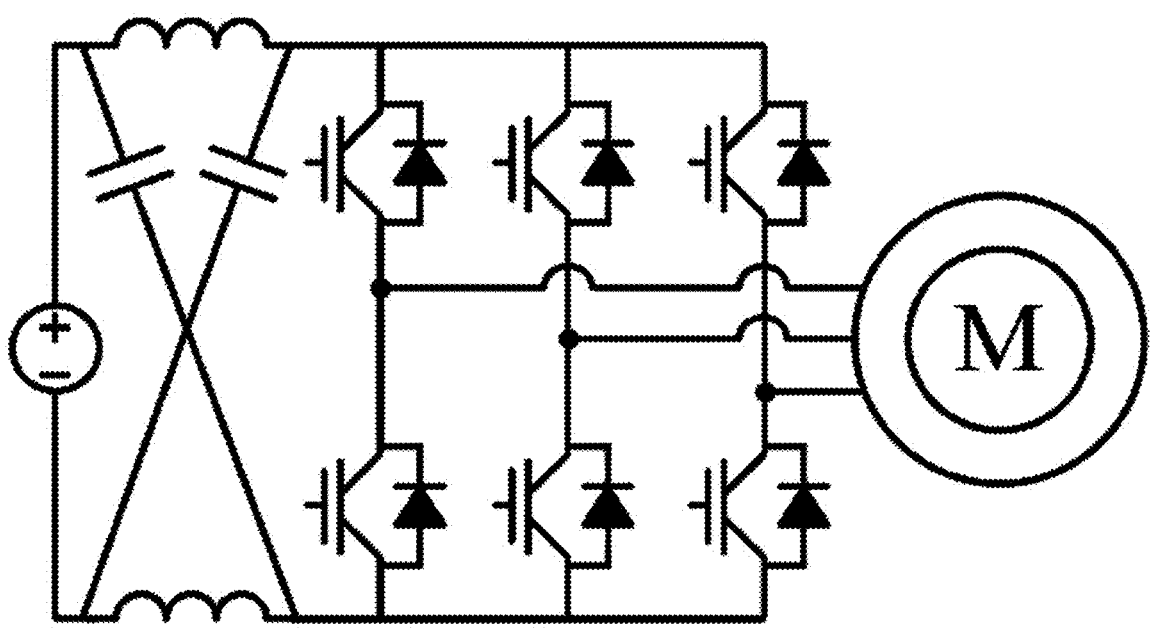

In the graphs of the drawings, a block dotted line represents a case where the power network circuit 130 is not provided.

REFERENCE SIGNS LIST

100: motor driving system
110: AC motor
120: inverter unit
130: power network circuit
140: controller
150: voltage source

BEST MODE

The following detailed description of the present disclosure refers to the accompanying drawings that illustrate specific embodiments in which the present disclosure may be implemented as an example. These embodiments are described in sufficient detail to enable a person skilled in the art to practice the present disclosure. It should be understood that various embodiments of the present disclosure are different from each other, but need not be mutually exclusive. For example, specific shapes, structures and characteristics described herein implemented in an embodiment may be implemented in other embodiments without departing from the idea and scope of the present disclosure. In addition, it should be understood that locations or arrangement of individual components in each embodiment disclosed herein may be changed without departing from the idea and scope of the present disclosure. Accordingly, the following detailed description is not intended in a limiting sense, and the scope of the present disclosure, if properly described, is limited only by the appended claims, along with all scopes equivalent to those claims. Like reference numerals in the drawings refer to the same or similar functions over several aspects.

Figure 4:
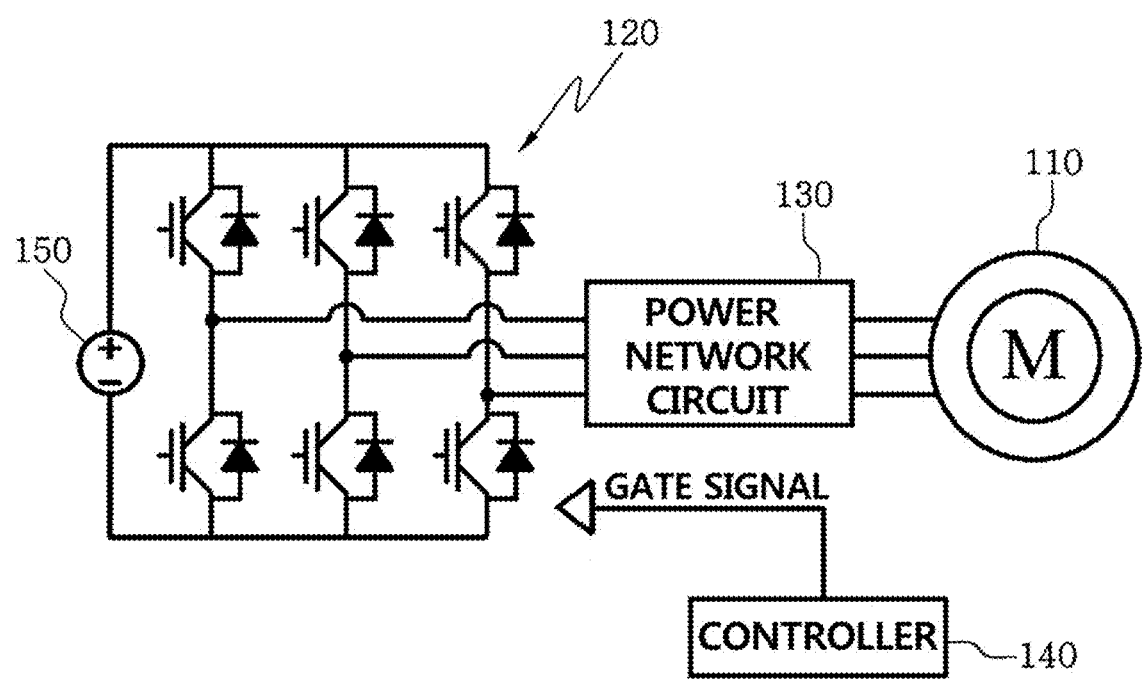
FIG. 4 shows a motor driving system 1000 having a power network between an inverter and a motor according to an embodiment of the present disclosure.

FIG. 4 shows a motor driving system 100 having a power network between an inverter and a motor according to an embodiment of the present disclosure. The motor driving system 100 including a power network between an inverter and a motor includes an AC motor 110, an inverter unit 120 for applying a voltage to the AC motor 110, a controller 140 for controlling an output voltage of the inverter unit 120, and a power network circuit 130 disposed between the inverter unit 120 and the AC motor 110. Here, the power network circuit 130 may be configured with a passive element, and preferably may be composed only of a capacitor, an inductor, or a combination thereof. That is, the power network circuit 130 may be a lossless system having only ineffective components. In addition, a voltage source 150 for supplying a DC voltage to the inductor unit 120 may be further included.

The controller 140 plays a role of controlling the output voltage of the inverter unit 120. The controller 100 may include at least one of a current command generator, a weak magnetic flux controller, a current controller, a voltage controller, a step voltage generator, a compensation voltage generator, a PWM unit, and a coordinate converter, but is not limited thereto. The controller 140 needs current and angle information to control the output voltage of the inverter unit. For example, the controller 140 may obtain a current value through a sensor mounted at an output terminal of the motor 110 or recover a phase current from a 3 or 1 shunt resistance of a leg. In addition, the angle information may be read through an additional device such as a Hall sensor or a resolver, or the angle information may be electrically estimated through a sensorless method or the like, but the present disclosure is not limited thereto.

FIG. 4 shows a three-phase motor and a three-phase inverter, but the motor driving system 100 of the present disclosure is not limited to the three-phase circuit, but may also be applied to a single-phase or other multi-phase (five-phase, six-phase, seven-phase, or the like) circuit.

In addition, the AC motor 110 may be at least one selected from an induction motor (IM), a surface-mounted permanent magnet synchronous motor (SPM), and an interior permanent magnet synchronous motor (IPM), but is not limited thereto, and any type of AC motor is included therein.

Figure 5:
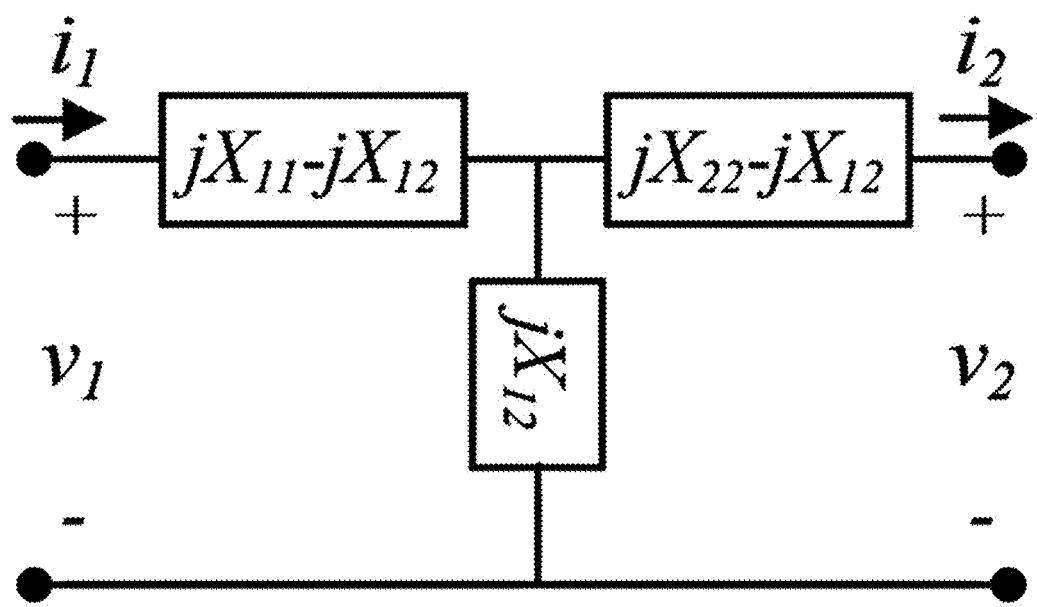
FIG. 5 shows a per-phase impedance structure model of a power network circuit 130 according to an embodiment of the present disclosure.

FIG. 5 shows a per-phase impedance structure model of a power network circuit 130 according to an embodiment of the present disclosure. FIG. 5 shows a circuit diagram in which the power network circuit 130 is inserted between the inverter unit 120 and the AC motor 120 in an equivalent per-phase circuit of FIG. 1. According to an embodiment of the present disclosure, the power network circuit 130 may be configured as a T-type impedance model, and the input and output characteristics of the power network circuit 130 may be determined by appropriately adjusting X11, X12 and X22 values. That is, the power network circuit 130 may be configured by determining the value of the passive element corresponding to X11, X12, and X22.

In a specific embodiment, the power network circuit 130 may be configured as follows, but is not limited thereto.

1) a capacitor connected in series to the AC motor
2) a capacitor connected in series to the AC motor and an inductor connected in parallel thereto
3) an inductor connected in parallel to the AC motor and a capacitor connected in series thereto
4) a capacitor and an inductor in series to the AC motor and an inductor connected in parallel thereto
5) a capacitor and an inductor in series to the AC motor and a capacitor connected in parallel thereto
6) an inductor connected in series to the AC motor and an inductor and a capacitor connected in parallel thereto
7) a capacitor connected in series to the AC motor and an inductor and a capacitor connected in parallel thereto As in 1) to 7) mentioned above, when connecting a capacitor and an inductor, the values of each capacitor and inductor may be determined in various ways depending on the type of the AC motor. For example, if the power network circuit 130 is configured with capacitors connected in series, X12 becomes 0.

Figure 6:
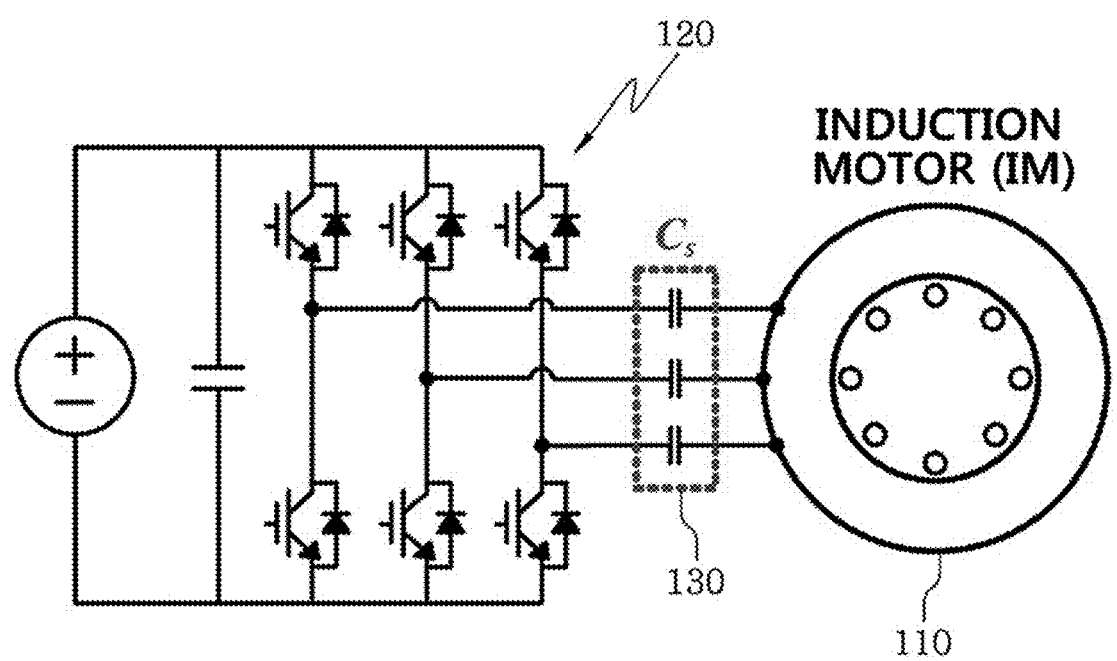
FIG. 6 shows a case where an induction motor is used as an AC motor 110 according to an embodiment of the present disclosure and the power network circuit 130 is configured with a capacitor connected in series to the AC motor.

FIG. 6 shows a case where an induction motor is used as an AC motor 110 according to an embodiment of the present disclosure and the power network circuit 130 is configured with a capacitor connected in series to the AC motor.

Figure 7A:
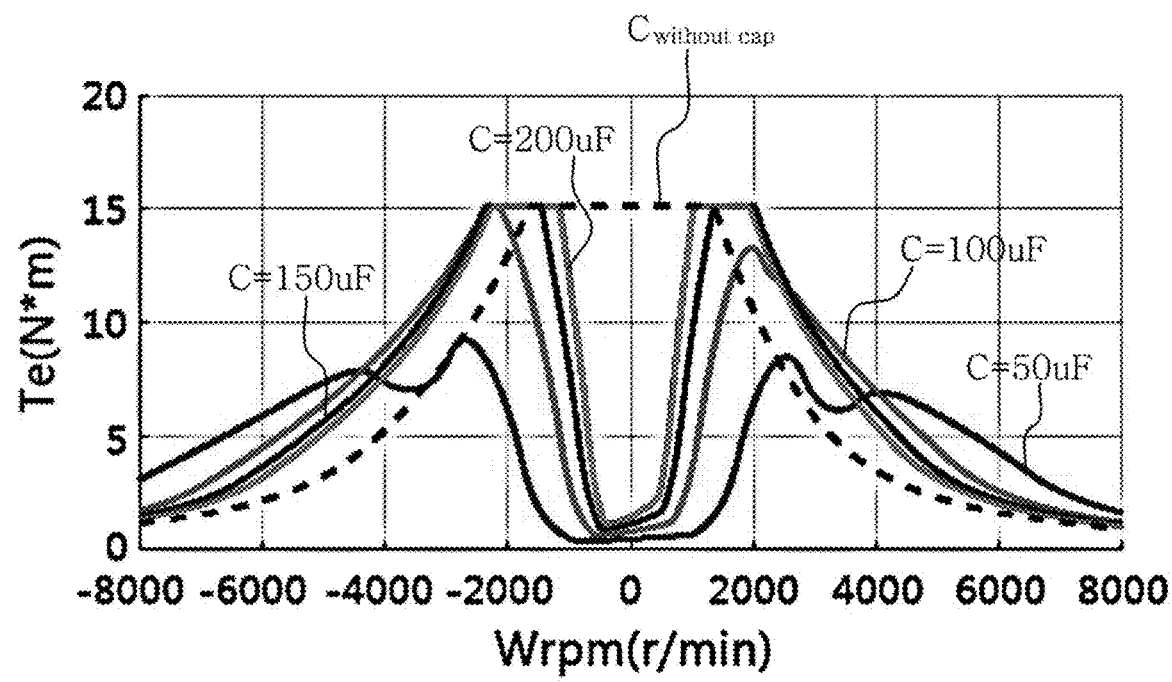
FIGS. 7A and 7B show a speed-torque curve (FIG. 7A) and a speed-output power curve (FIG. 7B) according to a capacitor value of the circuit of FIG. 6.
Figure 7B:
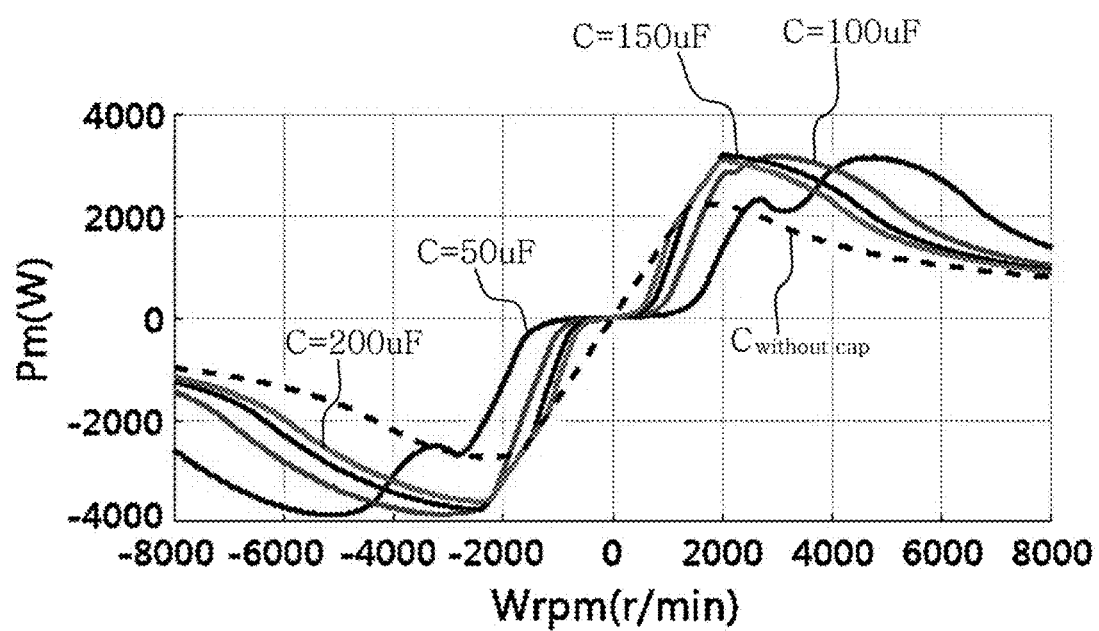

FIGS. 7A and 7B show a speed-torque curve (FIG. 7A) and a speed-output power curve (FIG. 7B) according to a capacitor value of the circuit of FIG. 6. Referring to FIGS. 7A and 7B, it may be understood that the maximum output power at a specific speed is increased compared to the case where there is no capacitor (without cap).

Figure 8:
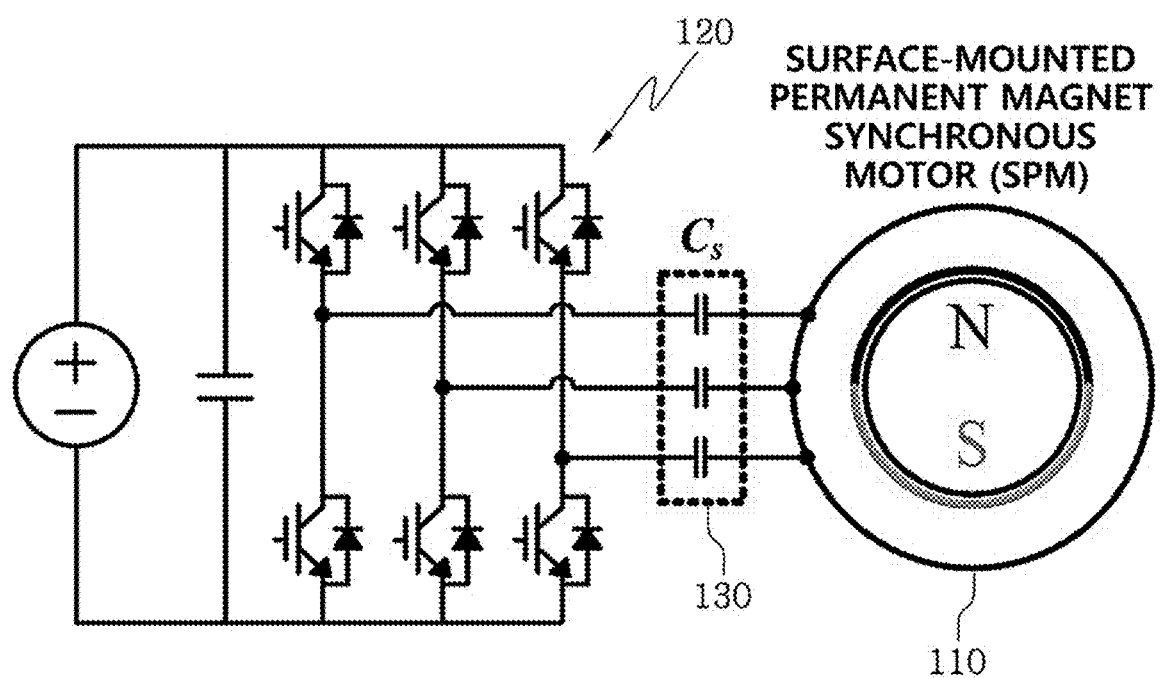
FIG. 8 shows a case where a surface-mounted permanent magnet synchronous motor is used as the AC motor 110 according to an embodiment of the present disclosure and the power network circuit 130 is configured with a capacitor connected in series to the AC motor.

FIG. 8 shows a case where a surface-mounted permanent magnet synchronous motor is used as the AC motor 110 according to an embodiment of the present disclosure and the power network circuit 130 is configured with a capacitor connected in series to the AC motor.

Figure 9A:
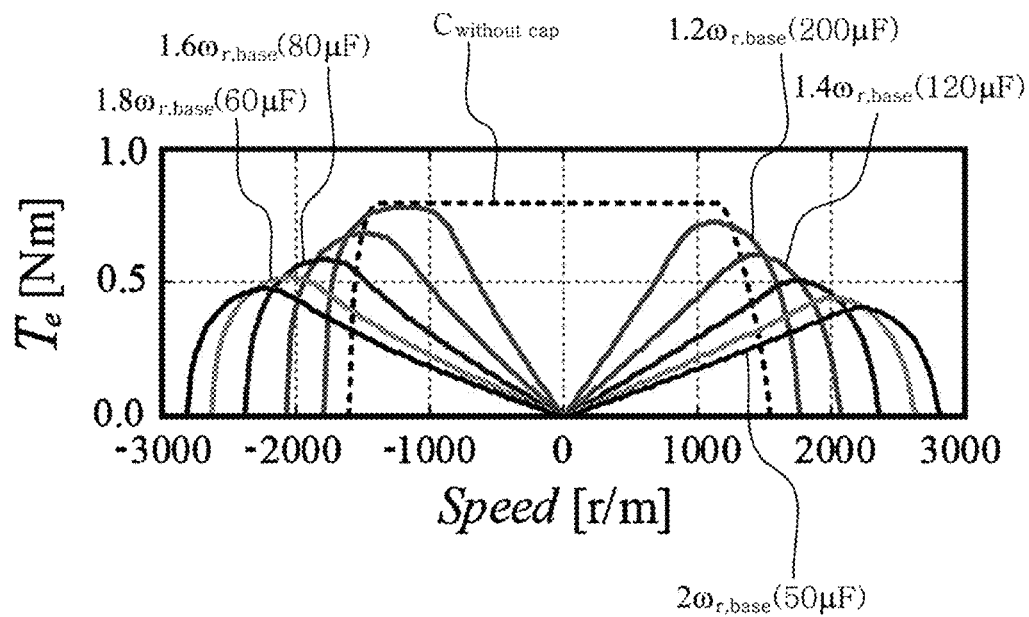
FIGS. 9A and 9B show a speed-torque curve (FIG. 9A) and a speed-output power curve (FIG. 9B) according to a capacitor value of the circuit of FIG. 8.
Figure 9B:
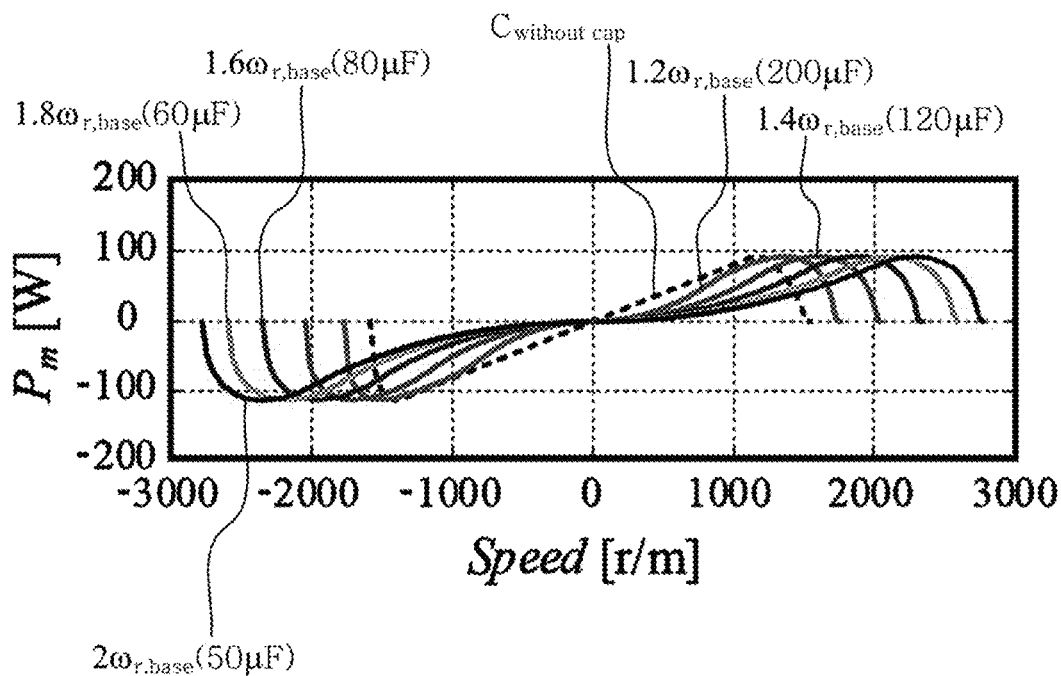

FIGS. 9A and 9B show a speed-torque curve (FIG. 9A) and a speed-output power curve (FIG. 9B) according to a capacitor value of the circuit of FIG. 8. Referring to FIGS. 9A and 9B, it may be understood that the speed for outputting the maximum power is increased compared to the case where there is no capacitor (without cap).

Figure 10:
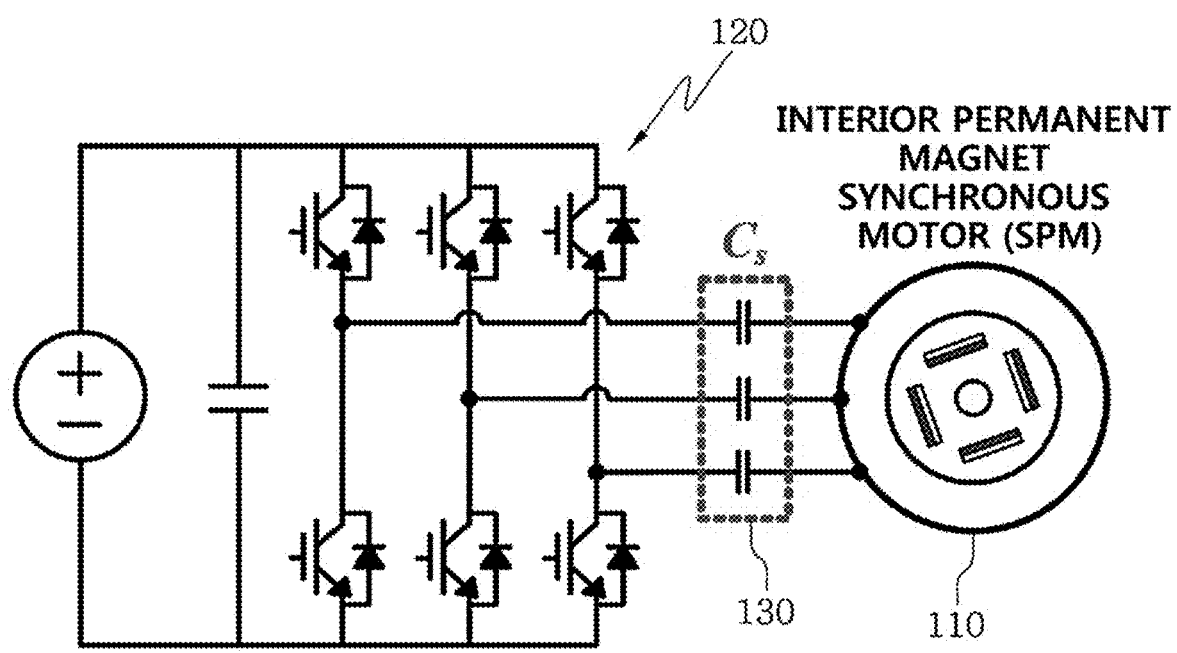
FIG. 10 shows a case where an interior permanent magnet synchronous motor is used as the AC motor 110 according to an embodiment of the present disclosure and the power network circuit 130 is configured with a capacitor connected in series to the AC motor.

FIG. 10 shows a case where an interior permanent magnet synchronous motor is used as the AC motor 110 according to an embodiment of the present disclosure and the power network circuit 130 is configured with a capacitor connected in series to the AC motor.

Figure 11A:
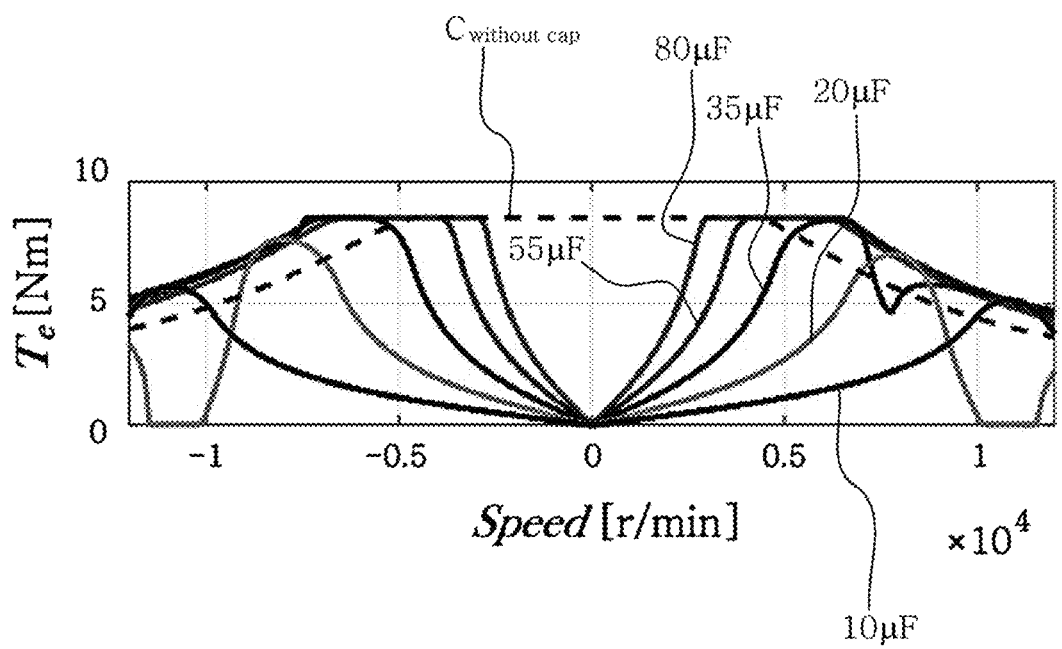
FIGS. 11A and 11B show a speed-torque curve (FIG. 11A) and a speed-output power curve (FIG. 11B) according to a capacitor value of the circuit of FIG. 10.
Figure 11B:
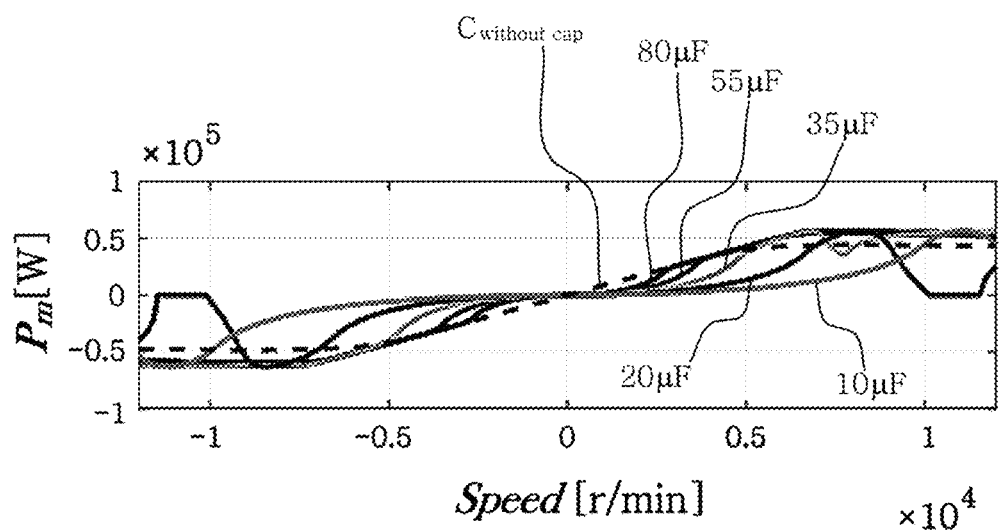

FIGS. 11A and 11B show a speed-torque curve (FIG. 11A) and a speed-output power curve (FIG. 11B) according to a capacitor value of the circuit of FIG. 10. Referring to FIGS. 11A and 11B, it may be understood that even in this case, the maximum output power at a specific speed is increased compared to the case where there is no capacitor (without cap).

Figure 12:
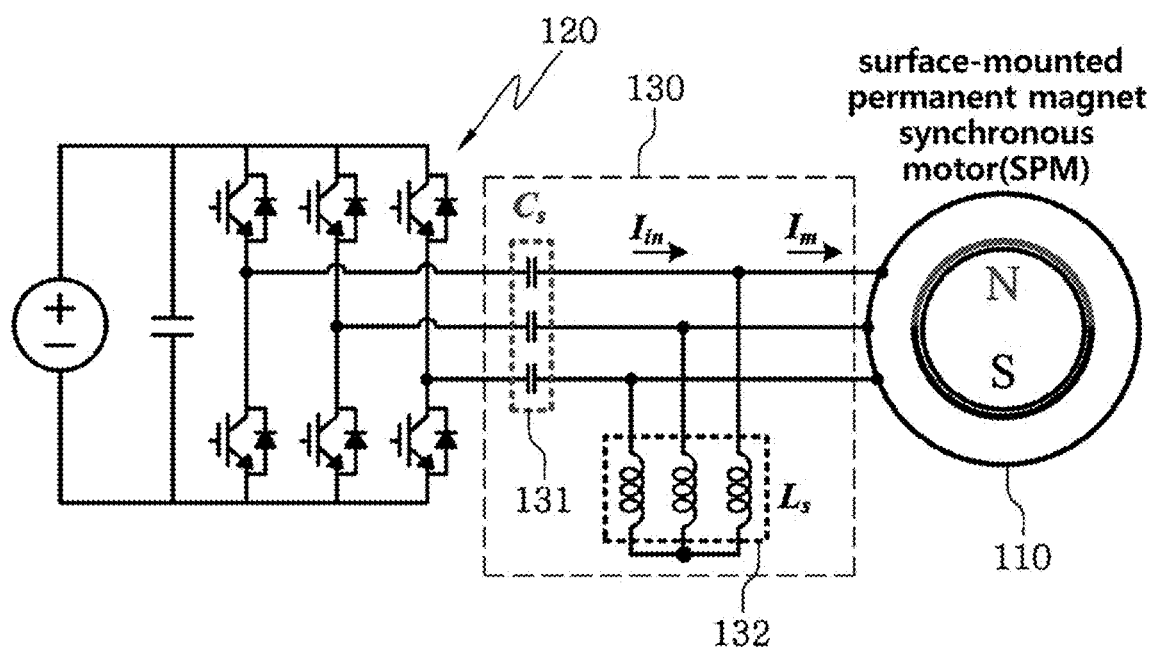
FIG. 12 shows a case where a surface-mounted permanent magnet synchronous motor is used as the AC motor 110 according to an embodiment of the present disclosure and the power network circuit 130 is configured with a capacitor 131 connected in series to the AC motor and an inductor 132 connected in parallel thereto.

FIG. 12 shows a case where a surface-mounted permanent magnet synchronous motor is used as the AC motor 110 according to an embodiment of the present disclosure and the power network circuit 130 is configured with a capacitor 131 connected in series to the AC motor and an inductor 132 connected in parallel thereto.

Figure 13A:
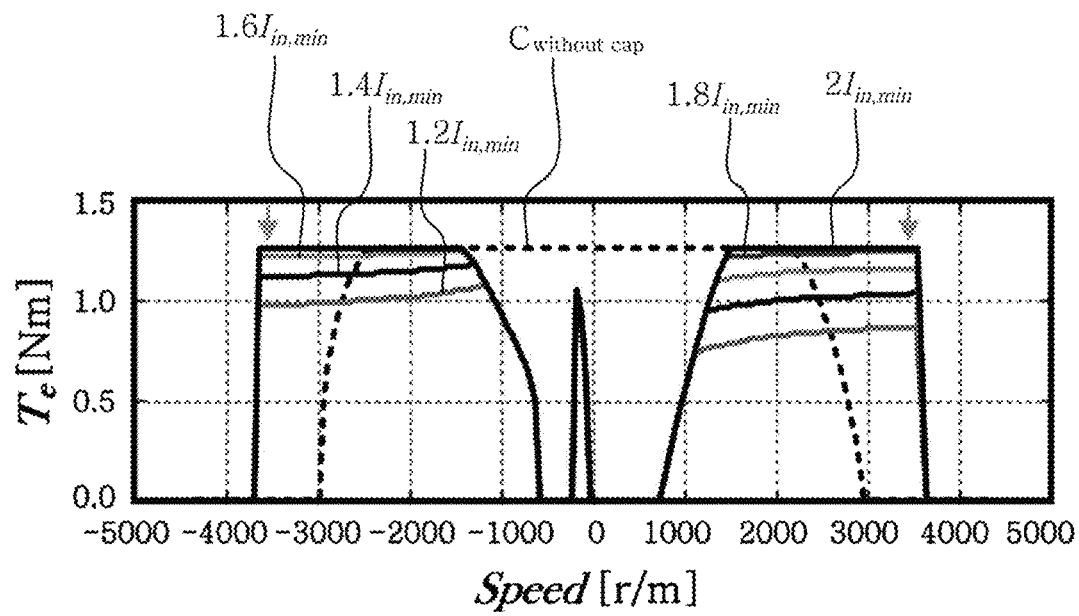
FIGS. 13A and FIG. 13B show a speed-torque curve (FIG. 13A) and a speed-output power curve (FIG. 13B) according to a ratio of the capacitor and the inductor in the circuit of FIG. 12.
Figure 13B:
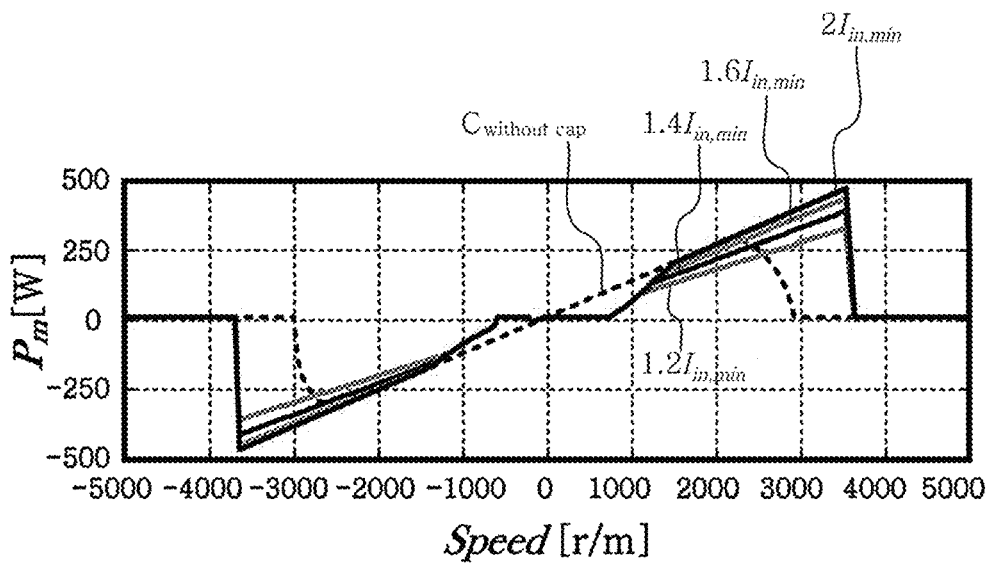

FIGS. 13A and FIG. 13B show a speed-torque curve (FIG. 13A) and a speed-output power curve (FIG. 13B) according to a current limit value of the inverter unit in the circuit of FIG. 12. FIGS. 13A and FIG. 13B show a capability curve according to the output current at the inverter unit in a state in which the output voltage at the inverter unit 120 is limited and the current input to the AC motor 110 is limited, and LC connected in series and parallel are connected thereto, so it may be understood that the AC motor 110 may show higher output power than the case where there is no LC (a black dotted line). Since optimization is not made in the two degrees of freedom, a large current is needed at the output terminal of the inverter.

Figure 14:
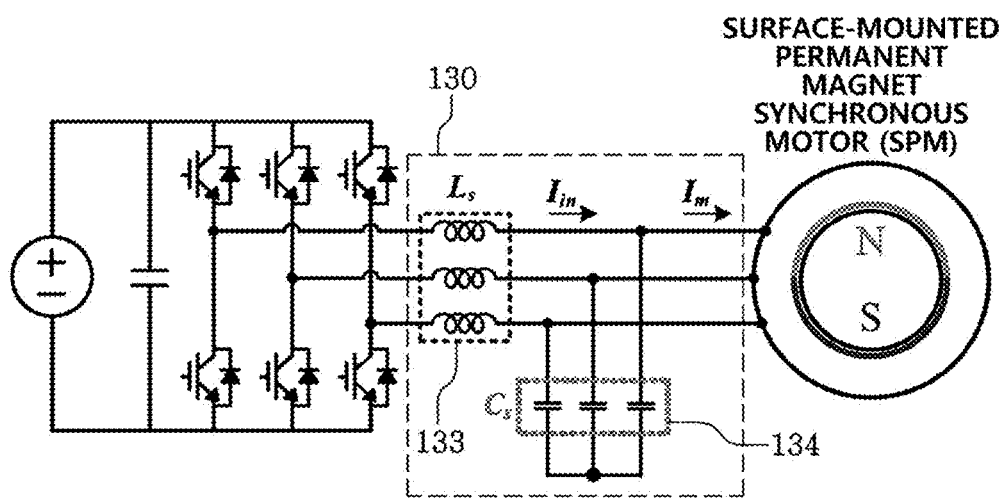
FIG. 14 shows a case where a surface-mounted permanent magnet synchronous motor is used as the AC motor 110 according to an embodiment of the present disclosure and the power network circuit 130 is configured with an inductor 133 connected in series to the AC motor and a capacitor 134 connected in parallel thereto.
Figure 15A:
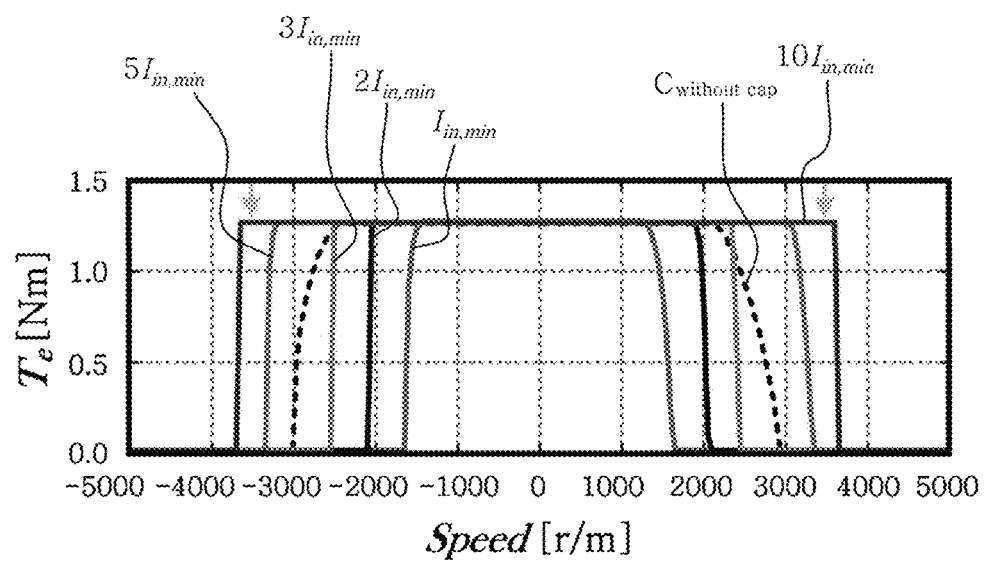
FIGS. 15A and 15B show a speed-torque curve (FIG. 15A) and a speed-output power curve (FIG. 15B) according to a ratio of the capacitor and the inductor in the circuit of FIG. 14.
Figure 15B:
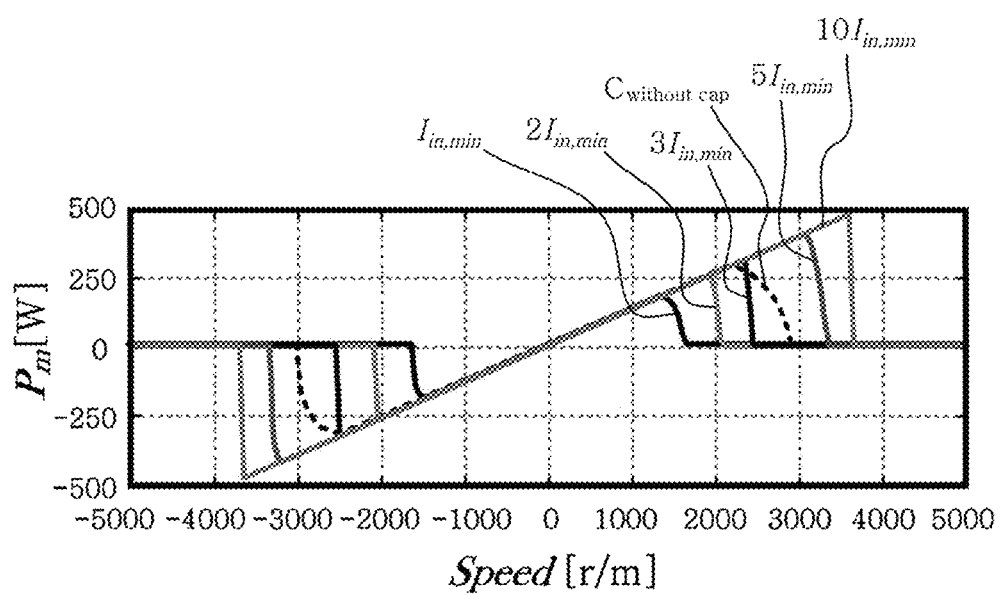

FIG. 14 shows a case where a surface-mounted permanent magnet synchronous motor is used as the AC motor 110 according to an embodiment of the present disclosure and the power network circuit 130 is configured with an inductor 133 connected in series to the AC motor and a capacitor 134 connected in parallel thereto. FIGS. 15A and 15B show a speed-torque curve (FIG. 15A) and a speed-output power curve (FIG. 15B) according to a current limit value of the inverter unit in the circuit of FIG. 14.

FIGS. 15A and 15B show a capability curve according to the output current at the inverter unit in a state where the output voltage at the inverter unit 120 is limited and the current input to the AC motor 110 is limited, and LC connected in series and parallel are applied thereto, so it may be understood that the AC motor 110 may show higher output power than the case where there is no LC (a black dotted line). Since optimization is not made in the two degrees of freedom, a large current is needed at the output terminal of the inverter.

Hereinafter, a method of determining values of passive elements configuring the power network circuit 130 will be described.

A. Design of a Power Network Circuit Configured with a Capacitor

As for the motor driving system 100 of the embodiment of FIG. 8, in a surface-mounted permanent magnet synchronous motor (SPM) having a symmetrical structure, Formula 1 may be determined as below. Since the surface-mounted permanent magnet motor has a perfectly symmetrical structure and the rotation frequency is fixed as a synchronous frequency, the capacitor value may be determined simply as in Formula 1.

$$C_{s\_SPM} = \frac{I_{s\_rated}\left(I_{s\_rated}L_s\omega_{r\_target} - \sqrt{\lambda_f^2\omega_{r\_target}^2 - V_{max}^2}\right)}{I_{s\_rated}^2 L_s^2 \omega_{r\_target}^3 - \lambda_f^2\omega_{r\_target}^3 + V_{max}^2\omega_{r\_target}}$$ [Formula 1]

Here, Ls represents an inductance of the motor, λ represents a magnetic flux density of the permanent magnet, Vmax represents a maximum voltage of the inverter unit, and Is_rated represents a current limit value of the motor. Seeing Formula 1, the capacitor value for obtaining the maximum output at a specific speed ω may be determined.

That is, if the power network circuit is configured with a capacitor connected in series to the AC motor, the value of the capacitor may be determined based on the inductance of the AC motor, the magnetic flux density of the permanent magnet of the AC motor, and the maximum voltage of the inverter unit.

Figure 16:
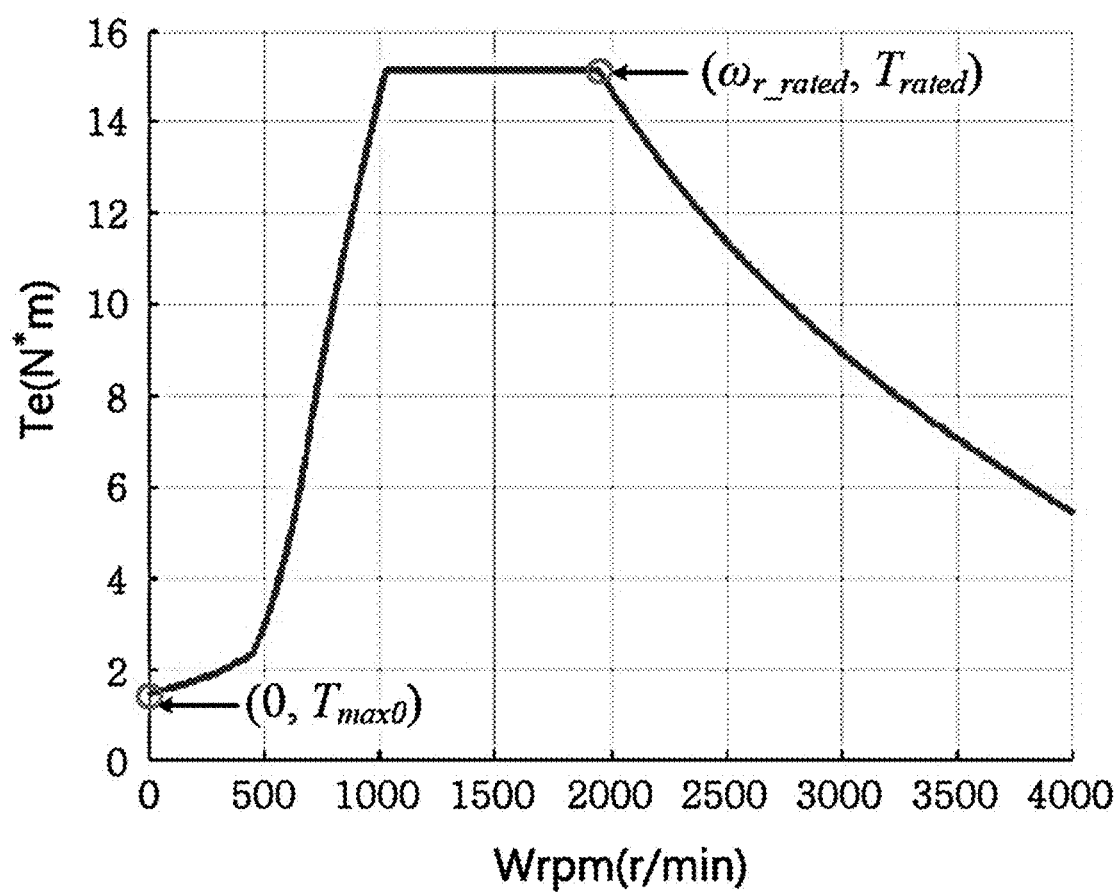
FIG. 16 show a speed-torque relationship of the induction motor.

Meanwhile, in the induction motor (IM), a slip frequency varies according to the current, and the synchronization frequency is changed at a fixed speed. Therefore, the formula for determining Cs in consideration of the above factors becomes complicated. Thus, according to an embodiment of the present disclosure, if the induction motor is used, the value of the capacitor connected in series may be designed by determining the maximum torque in a stop state and the maximum speed for outputting a rated torque as shown in FIG. 16.

Specifically, in the induction motor (IM), the maximum and minimum values of the capacitor value connected in series may be determined according to Formula 2 below, and in Formula 3, the value of the capacitor may be determined as a value between the maximum and minimum values determined in Formula 2.

$$C_{max}(\omega_{r\_rated}) = \frac{\frac{1}{\omega_{e\_rated}^2} I_{s\_rated}^2}{(\sigma L_s I_{qs}^{e2} + L_s I_{ds}^{e2}) - \sqrt{(\sigma L_s I_{qs}^{e2} + L_s I_{ds}^{e2})^2 - I_{s\_rated}^2 \left((\sigma L_s)^2 I_{qs}^{e2} + (L_s)^2 I_{ds}^{e2} - \frac{V_{s\_max}^2}{\omega_{e\_rated}^3}\right)}}$$ [Formula 2]

$$\omega_{e\_rated} = \omega_{r\_rated} + \frac{R_r}{L_r} \frac{I_{qs1}^e}{I_{ds1}^e}, \quad I_{ds1}^e = \frac{\lambda_{r\_rated}}{L_m}, \quad I_{qs1}^e = \sqrt{I_{s\_rated}^2 - (I_{ds}^e)^2}$$

$$C_{min}(T_{max0}) = \frac{\frac{1}{\omega_{e0}^2} I_{s\_rated}^2}{(\sigma L_s I_{qs0}^{e2} + L_s I_{ds0}^{e2}) + \sqrt{(\sigma L_s I_{qs0}^{e2} + L_s I_{ds0}^{e2})^2 - I_{s\_rated}^2 \left((\sigma L_s)^2 I_{qs0}^{e2} + (L_s)^2 I_{ds0}^{e2} - \frac{V_{s\_max}^2}{\omega_{e0}^2}\right)}}$$

$$\omega_{e@\omega_r=0,T_e=T_{max}} = \omega_{e0} = \frac{R_r}{L_r} \frac{I_{qs}^e}{I_{ds}^e} = \frac{R_r}{L_r} \frac{I_{qs0}^e}{I_{ds0}^e}, \quad I_{ds0}^{e2} = \frac{I_{s\_rated}^2 - \sqrt{I_{s\_rated}^4 - 4\left(\frac{T_{max0}}{\frac{3}{2}\frac{P}{2}\frac{L_m^2}{L_r}}\right)^2}}{2}, \quad I_{qs0}^e = \sqrt{I_{s\_rated}^2 - I_{ds0}^{e2}}$$

Here, Ls is an inductance of the motor. Rr is a resistance of the rotor and Rs is a resistance of the stator.

σ is a leakage coefficient of the motor. ωe_rated is a rated electric speed of the motor.

ωr_rated is a rated speed of the motor rotor. Vs_max is a synthesizable voltage limit.

ωr_rated is a rated magnetic flux of the motor. Idqs0, e0 is a current for generating the corresponding torque Tmax0 at 0 speed.

$$C_{min}(T_{max0}) \le C_s \le C_{max}(\omega_{r\_rated})$$ [Formula 3]

B. Design of a Power Network Circuit Configured with Two Elements of LC or CL

Figure 17:
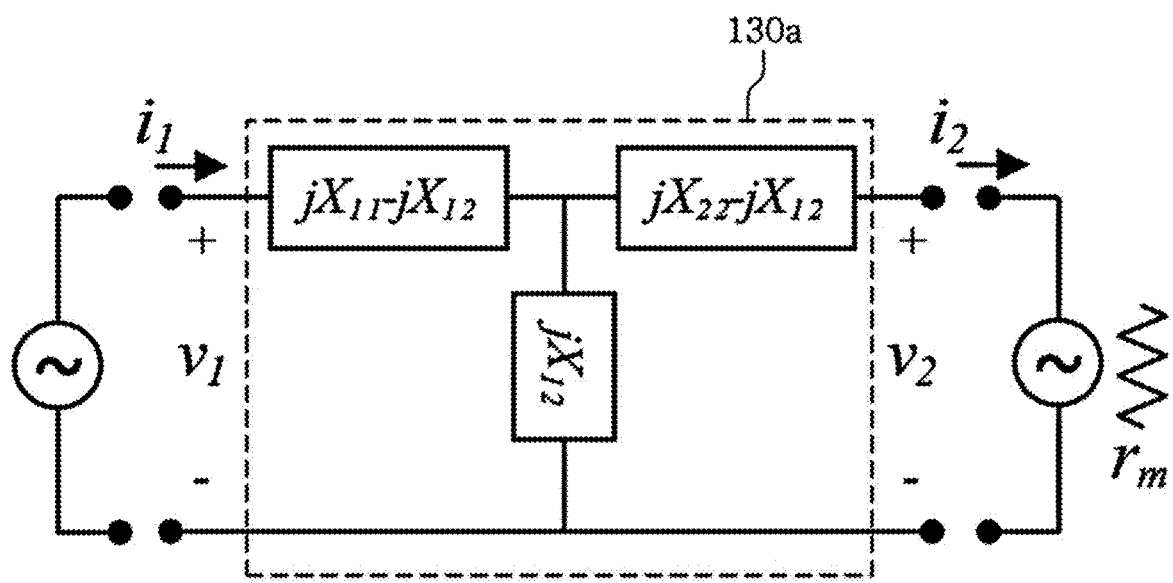
FIG. 17 show a per-phase equivalent circuit when a surface-mounted permanent magnet synchronous motor (SPM) is used as the AC motor.

A method of designing a power network circuit configured with the LC element described above when the surface-mounted permanent magnet synchronous motor (SPM) is used as the AC motor 110 will be described. FIG. 17 shows a per-phase equivalent circuit when the surface-mounted permanent magnet synchronous motor (SPM) is used as the AC motor.

As described above, according to an embodiment of the present disclosure, the power network circuit 130 may be configured as a T-type impedance model, and the input and output characteristics of the power network circuit 130 may be determined by appropriately adjusting the X11, X12, and X22 values.

For example, referring to FIG. 5 or 17, the power network circuit is configured with at least one of a capacitor and an inductor, and the T-type impedance model may be configured with a first impedance and a second impedance connected in series to the AC motor, and a third impedance extending from a node between the first impedance and the second impedance and connected in parallel to the first impedance and the second impedance. Here, the first impedance, the second impedance and the third impedance may be expressed as follows.

First impedance: jX11-jX12
Second impedance: jX22-jX12
Third impedance: jX12

For the electromotive force of the surface-mounted permanent magnet synchronous motor (SPM), since a power factor of the phase current is mainly controlled to 1, the counter electromotive force of the motor may be replaced with a resistance. If the output voltage v1 of the inverter unit and the counter electromotive force voltage v2 of the surface-mounted permanent magnet synchronous motor (SPM) may be expressed as a per-phase equivalent circuit, as shown in FIG. 17. The right impedance (jX22-jX12) of the T-model is a value including the resistance of the motor and the inductance value.

In FIG. 17, rm of the per-phase equivalent circuit (the equivalent resistance of the motor) may be determined as in Formula 4 according to the output speed and power of the motor.

$$r_m = \frac{1}{6} \frac{(\lambda_f \omega_r)^2}{P_m}$$ [Formula 4]

Here, λf represents a magnetic flux density of the permanent magnet, wr represents the speed, and Pm represents an output power of the motor.

In an embodiment, the power factor of the input impedance may be limited to 1 in order to minimize conduction loss caused by ineffective power. Therefore, if the voltage boosting ratio is multiplied by a at the frequency to be designed, the input impedance must be exhibited as 1/α² by the energy conservation law. For this, if the input impedance (zin=v1/i1) viewing the motor from the inverter unit in FIG. 17 is calculated, Formula 5 below may be obtained.

$$Z_{in} = \frac{X_{12}^2 r_m}{r_m^2 + X_{22}^2} + j\left[X_{11} - \frac{X_{12}^2 X_{22}}{r_m^2 + X_{22}^2}\right] = \frac{1}{\alpha^2} r_m$$ [Formula 5]

In order to show the impedance viewed from the inverter as a desired equivalent resistance of the power factor 1 as in the above formula, two degrees of freedom (X12, X22) are used among three impedances (X11, X12, X22). Additional optimization is possible through the remaining 1 degree of freedom. An optimization method using the remaining one degree of freedom may minimize the current flowing through the center impedance (X12). Through this, it is possible to minimize the output current of the inverter by reducing the current that does not contribute to the output power.

That is, X11, X12 and X22 may be determined so that the imaginary part becomes 0 in Formula 5.

Figure 18:
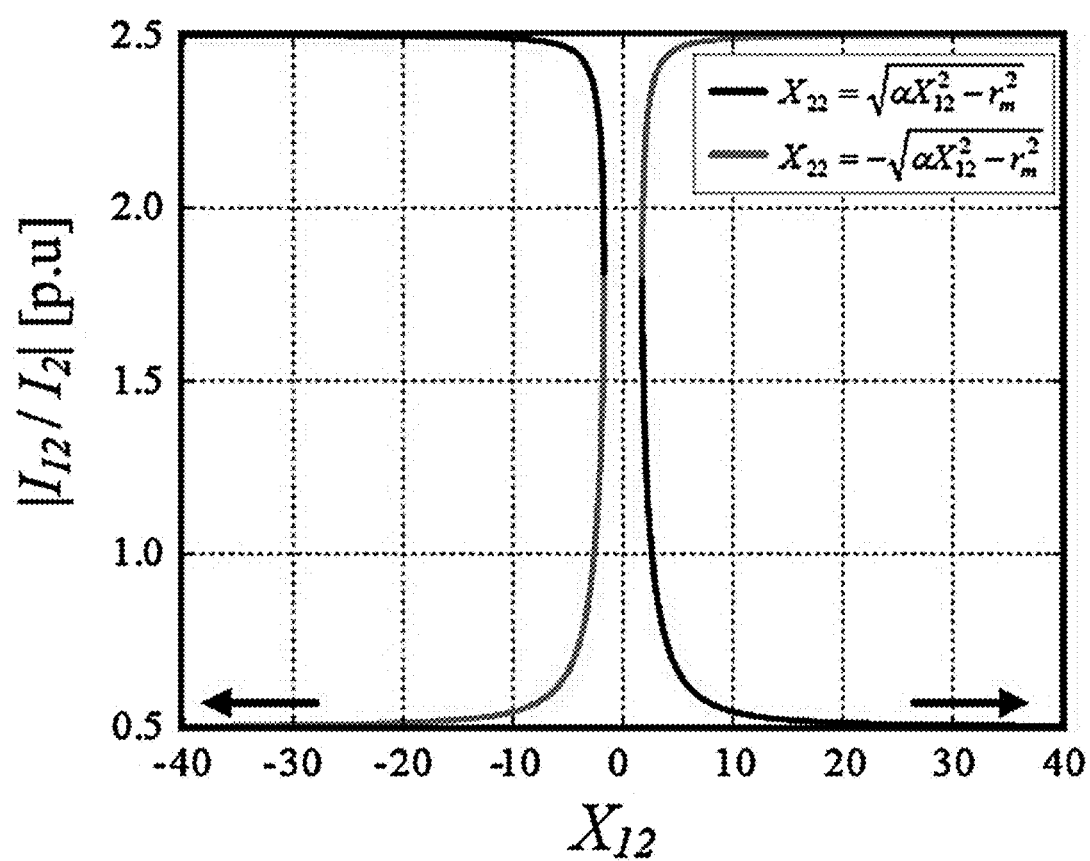
FIG. 18 shows the change of ratio of an output current (I2) according to impedance X12 and a current (I12) flowing to a middle impedance X12 of a T-type equivalent model.

FIG. 18 shows the change of ratio of an output current (I2) according to impedance X12 and a current (I12) flowing to a middle impedance X12 of a T-type equivalent model. A required X12 value may be determined by referring to the graph of FIG. 18.

Figure 19A:
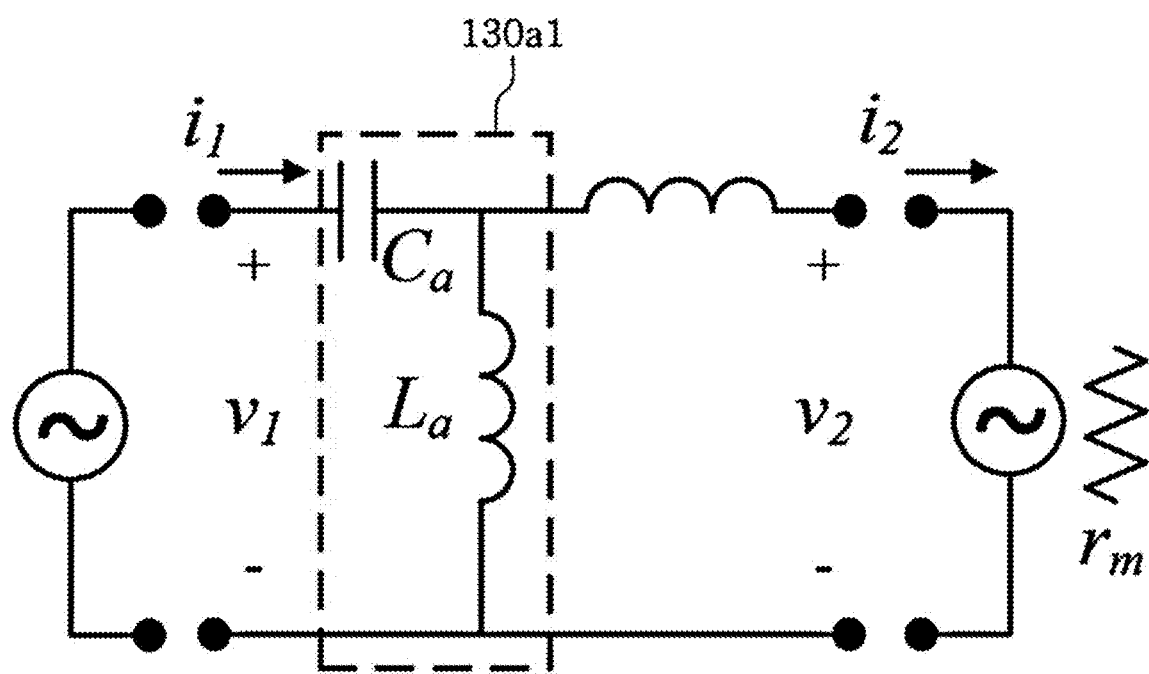
FIGS. 19A and 19B show a power network circuit 130 configured with a per-phase CL, LC.
Figure 19B:
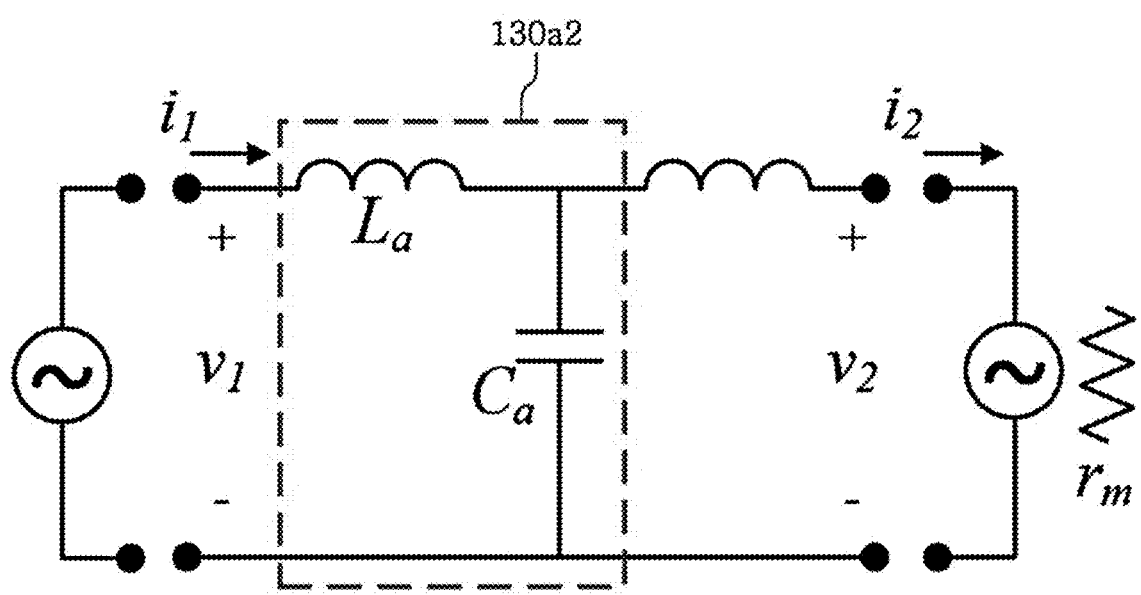

FIGS. 19A and 19B show a power network circuit 130 configured with a per-phase CL, LC. FIG. 19A shows a power network circuit 130a1 configured with a capacitor connected in series and an inductor connected in parallel, and FIG. 19B shows a power network circuit 130a2 configured with an inductor connected in series and a capacitor connected in parallel.

As such, since the power network circuit is designed so that the imaginary part becomes 0 through Formula 5, the power factor of the inverter becomes 1, thereby minimizing the power loss of the inverter.

Meanwhile, in another embodiment, the power network circuit may be designed so that the imaginary part does not become 0.

In the power network circuit, minimizing the loss of the inverter by designing the power factor of the inverter to be 1 may not minimize the size (or, power loss) of the entire system. In other words, in terms of minimizing the size (or, power loss) of the entire system, it would be more advantageous to obtain a gain in terms of power loss in other parts of the system (for example, the power network circuit) even though the power loss of the inverter is somewhat damaged.

Due to the recent development of semiconductor devices, the inverter loss is decreasing in the latest inverters and its size is also decreasing. In light of this trend, the ratio of the power loss of the power network circuit is likely to be greater than the power loss of the inverter when the latest inverter is used.

In the embodiment, if the power ratio of the power network circuit is greater than the power ratio of the inverter, the power network circuit may be configured to minimize the size (or, power loss) of the entire motor driving system. For example, when the sum of the size (or, power loss) of the power network circuit and the size (or, power loss) of the inverter unit is minimized, the size (or, power loss) of the entire system may be minimized. Here, when the power network circuit is configured with passive elements, the size of the power network circuit may be expressed as the sum of maximum values of reactive powers of all passive elements.

A user or designer may design the power network circuit by determining characteristic values of passive elements based on the purpose of the power network circuit applied to the motor driving system, the power ratio of the inverter, the power ratio of the power network circuit, and the like.

C. Design of a Power Network Circuit Configured with Three Elements

Figure 20A:
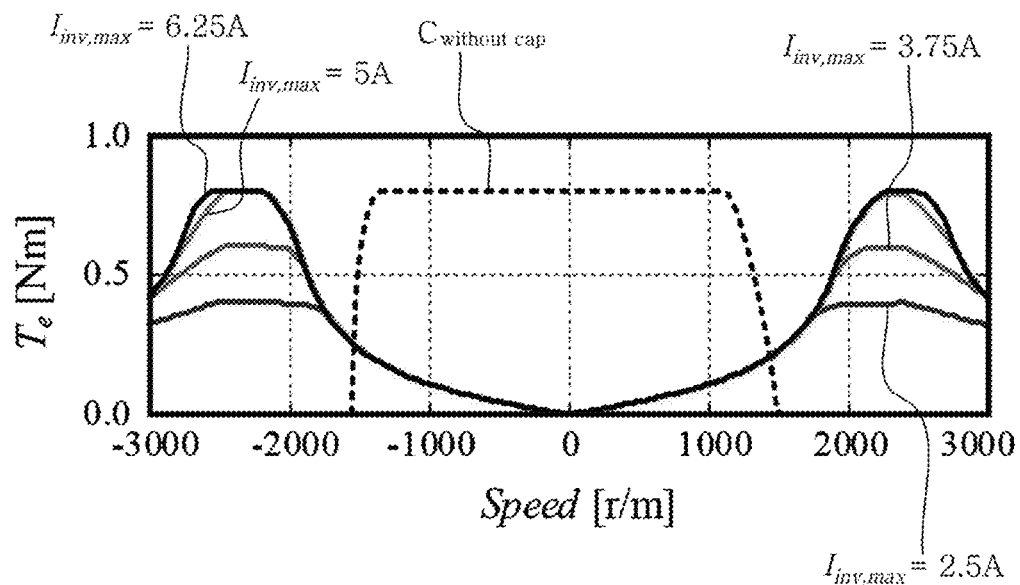
FIGS. 20A and 20B show a capability curve when the power network circuit 130 is configured with an LCC in an embodiment.
Figure 20B:
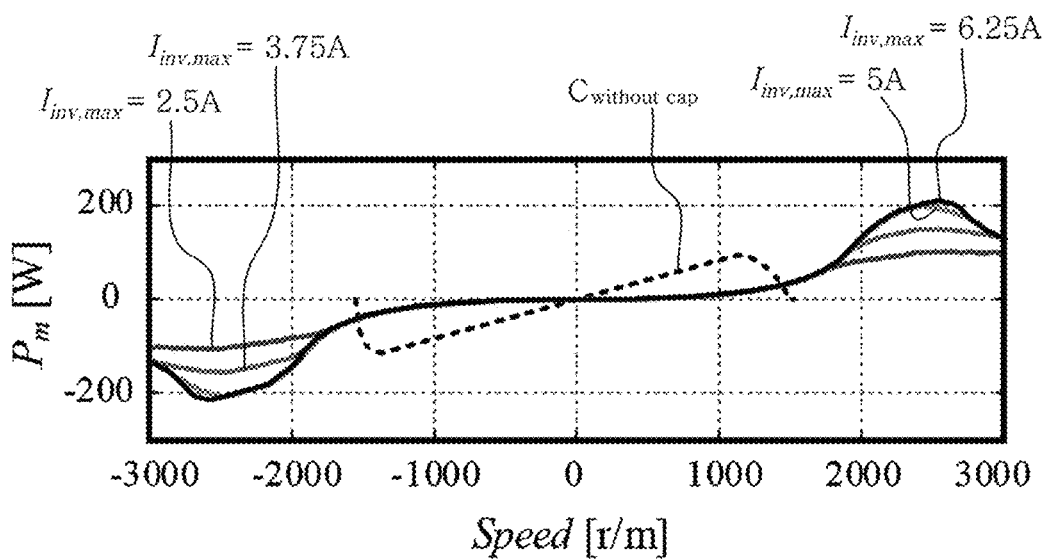

FIGS. 20A and 20B show a capability curve when the power network circuit 130 is configured with an LCC in an embodiment. The capability curves of FIGS. 20A and 20B are drawn by limiting the current of the motor 110 to 1 and changing the current limit at the inverter unit. Since the power factor is designed as 1 at the target speed of 2400 r/m, it may be found that the maximum torque and maximum power are output at the corresponding speed. This curve has a similar shape to the series capacitor, but has a higher efficiency than the series capacitor structure because the power factor is designed as 1 at the maximum speed. The capacity curve of an existing motor is as shown by a black dotted line.

In addition, in an embodiment of the present disclosure, the power network circuit 130 may further include a mechanical switch or an electric switch. The mechanical or electric switch may be turned off in a first mode in which the AC motor is operating at a speed less than a predetermined speed and turned on in a second mode in which the AC motor is operating at a speed equal to or greater than a predetermined speed. That is, if a speed greater than the predetermined speed is required, the mechanical or electric switch may be controlled to be turned on so that the power network circuit of the present disclosure operates. In this case, compensating the existing mechanical gear system may be configured in an electrical form, which has an advantage of compensating for the disadvantages such as wear, noise and clutch timing of the existing mechanical gear.

In the method for designing a motor driving system having a power network between an inverter and a motor according to an embodiment of the present disclosure, the motor driving system may include an AC motor, an inverter unit configured to apply a voltage to the AC motor, a controller configured to control an output voltage of the inverter unit, and a power network circuit disposed between the inverter unit and the AC motor, and the power network circuit may be configured with a passive element and configured as a T-type impedance model.

In an embodiment, if the power network circuit is configured with a capacitor connected in series to the AC motor, a value of the capacitor may be determined based on an inductance of the AC motor, a magnetic flux density of a permanent magnet of the AC motor and a maximum voltage of the inverter unit.

In an embodiment, the power network circuit may be configured with at least one of a capacitor and inductor, and the T-type impedance model may include a first impedance and a second impedance connected in series to the AC motor, and a third impedance extending from a node between the first impedance and the second impedance and connected in parallel to the first impedance and the second impedance, and the first impedance, the second impedance and the third impedance may expressed as follows.

First impedance: jX11-jX12
Second impedance: jX22-jX12
Third impedance: jX12

In this case, values of the capacitor and the inductor configuring the power network circuit may be determined such that a following formula satisfies 0.

$$X_{11} - \frac{X_{12}^2 X_{22}}{r_m^2 + X_{22}^2},$$

Here $r_m$ is an equivalent resistance of the AC motor.

Even though the present disclosure is described above based on specific matters such as specific components and limited embodiments and drawings, this is provided only to help a more general understanding of the present disclosure, and the present disclosure is limited to the embodiments. The present disclosure may be changed or modified in various ways by a person with ordinary knowledge in the technical field to which the present disclosure belongs.

Therefore, the idea of the present disclosure should not be limited to or determined by the described embodiment, and not only the appended claims but also all modifications or equivalents of the claims are regarded as falling within the scope of the idea of the present disclosure.

INDUSTRIAL APPLICABILITY

The motor driving system having a power network between an inverter and a motor according to an embodiment of the present disclosure improves the maximum output of the motor.

The power network circuit is configured to improve the output of various motors such as an induction motor (IM), a surface-mounted permanent magnet synchronous motor (SPM) and an interior permanent magnet synchronous motor (IPM), and may be widely used in the power field.

The invention claimed is:

1. A motor driving system comprising:
an alternating current (AC) motor;
an inverter unit configured to apply a voltage to the AC motor;
a controller configured to control an output voltage of the inverter unit; and
a power network circuit disposed between the inverter unit and the AC motor, the power network circuit including a mechanical switch or an electric switch, the mechanical switch or the electric switch turned off in a first mode in which the AC motor is operating at a speed less than a predetermined speed and the mechanical switch or the electric switch is turned on in a second mode in which the AC motor is operating at a speed equal to or greater than the predetermined speed,
wherein the power network circuit is a T-type impedance model configured with passive elements including at least one of a capacitor and an inductor, wherein the T-type impedance model includes:
a first impedance and a second impedance connected in series to the AC motor; and
a third impedance extending from a node between the first impedance and the second impedance and connected in parallel to the first impedance and the second impedance,
wherein the first impedance, the second impedance and the third impedance are expressed as follows:
first impedance: $jX11-jX12$
second impedance: $jX22-jX12$
third impedance: $jX12$,
wherein j is an imaginary number, X11 is a reactance of a first passive element that is one of the capacitor or the inductor, X12 is a reactance of a second passive element that is one of the capacitor or the inductor, and X22 is a reactance of a third passive element that is one of the capacitor or the inductor,
wherein a power ratio of the power network circuit is a ratio of an output power of the power network circuit and an input power of the power network circuit, and a power ratio of the inverter unit is a ratio of an output power of the inverter unit and an input power of the inverter unit,
wherein when the power ratio of the power network circuit is greater than the power ratio of the inverter unit, a value of the impedance configuring the power network circuit is selected to minimize a sum of a size of the power network circuit and a size of the inverter unit, and
the size of the power network circuit is a sum of maximum values of reactive powers of all passive elements included in the power network circuit.

2. The motor driving system according to claim 1,
wherein the power network circuit is further configured with at least one of:
a capacitor connected in series to the AC motor;
a capacitor connected in series to the AC motor and an inductor connected in parallel thereto;
an inductor connected in parallel to the AC motor and a capacitor connected in series thereto;
a capacitor and an inductor in series to the AC motor and an inductor connected in parallel thereto;
a capacitor and an inductor in series to the AC motor and a capacitor connected in parallel thereto;
an inductor connected in series to the AC motor and an inductor and a capacitor connected in parallel thereto; and
a capacitor connected in series to the AC motor and an inductor and a capacitor connected in parallel thereto.

3. The motor driving system according to claim 2,
wherein when the power network circuit is further configured with a capacitor connected in series to the AC motor, a value of the capacitor is determined based on an inductance of the AC motor, a magnetic flux density of a permanent magnet of the AC motor and a maximum voltage of the inverter unit.

4. The motor driving system according to claim 1,
wherein the AC motor is at least one selected from a surface-mounted permanent magnet motor, an induction motor and an interior permanent magnet synchronous motor.

5. A method of designing a motor driving system including:
applying, by an inverter unit, a voltage to an alternating current (AC) motor;
controlling, by a controller, an output voltage of the inverter unit; and
configuring a power network circuit that is disposed between the inverter unit and the AC motor to include a mechanical switch or an electric switch, the mechanical switch or the electric switch turned off in a first mode in which the AC motor is operating at a speed less than a predetermined speed and the mechanical switch or the electric switch is turned on in a second mode in which the AC motor is operating at a speed equal to or greater than the predetermined speed,
wherein the power network circuit is further configured with passive elements and configured as a T-type impedance model including at least one of a capacitor and an inductor, wherein the T-type impedance model includes:
a first impedance and a second impedance connected in series to the AC motor; and
a third impedance extending from a node between the first impedance and the second impedance and connected in parallel to the first impedance and the second impedance,
wherein the first impedance, the second impedance and the third impedance are expressed as follows:
first impedance: $jX11-jX12$
second impedance: $jX22-jX12$
third impedance: $jX12$,
wherein j is an imaginary number, X11 is a reactance of a first passive element that is one of the capacitor or the inductor, X12 is a reactance of a second passive element that is one of the capacitor or the inductor, and X22 is a reactance of a third passive element that is one of the capacitor or the inductor,
wherein a power ratio of the power network circuit is a ratio of an output power of the power network circuit and an input power of the power network circuit, and a power ratio of the inverter unit is a ratio of an output power of the inverter unit and an input power of the inverter unit, wherein when the power ratio of the power network circuit is greater than the power ratio of the inverter unit, selecting a value of the impedance configuring the power network circuit to minimize a sum of a size of the power network circuit and a size of the inverter unit, and the size of the power network circuit is a sum of maximum values of reactive powers of all passive elements included in the power network circuit.

6. The method of designing the motor driving system according to claim 5, wherein when the power network circuit is further configured with a capacitor connected in series to the AC motor, determining a value of the capacitor based on an inductance of the AC motor, a magnetic flux density of a permanent magnet of the AC motor and a maximum voltage of the inverter unit.

* * * * *